(12) United States Patent
Lee

(10) Patent No.: US 7,068,285 B2
(45) Date of Patent: Jun. 27, 2006

(54) IMAGE CONVERTING APPARATUS AND METHOD THEREOF

(75) Inventor: Kyoung-Ju Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/715,420

(22) Filed: Nov. 19, 2003

(65) Prior Publication Data

US 2004/0125238 A1   Jul. 1, 2004

(30) Foreign Application Priority Data

Dec. 10, 2002   (KR) .................. 10-2002-0078468

(51) Int. Cl.
*G09G 5/02* (2006.01)
(52) U.S. Cl. .............. 345/605; 345/549; 345/550; 345/589; 345/591; 345/596; 345/597; 345/600; 382/167; 382/199
(58) Field of Classification Search ......... 345/549, 345/550, 591, 596, 597, 605, 589, 600; 382/167, 382/299
See application file for complete search history.

(56) References Cited

U.S. PATENT DOCUMENTS

| | | | |
|---|---|---|---|
| 5,469,190 A * | 11/1995 | Masterson ............. 345/605 |
| 5,649,083 A * | 7/1997 | Barkans et al. ......... 345/597 |
| 5,734,369 A | 3/1998 | Priem et al. |
| 5,854,640 A * | 12/1998 | North et al. ............ 345/547 |
| 5,864,345 A | 1/1999 | Wickstrom et al. |
| 5,933,131 A | 8/1999 | Rich |
| 6,188,386 B1 | 2/2001 | Hayashi et al. |
| 6,384,838 B1 | 5/2002 | Hannah |
| 6,556,209 B1 * | 4/2003 | Kondo ................ 345/550 |
| 6,778,187 B1 * | 8/2004 | Yi .................... 345/605 |
| 2003/0198381 A1 * | 10/2003 | Tanaka et al. ......... 382/166 |

FOREIGN PATENT DOCUMENTS

| | | |
|---|---|---|
| JP | 07-182512 | 7/1995 |
| JP | 09-101771 | 4/1997 |
| JP | 11-175693 | 7/1999 |
| JP | 2002-318577 | 10/2002 |
| KR | 1002320970000 | 9/1999 |
| KR | 1020020025471 | 4/2002 |

* cited by examiner

*Primary Examiner*—Matthew C. Bella
*Assistant Examiner*—Antonio Caschera
(74) *Attorney, Agent, or Firm*—Fleshner & Kim LLP

(57) ABSTRACT

A system and method for converting color images divides a first image into first RGB values per pixel, determines which of the RGB colors in the first image has a greater specific gravity, converts the first RGB values into second RGB color values based on the color with the greater specific gravity, and forms a second image based on the second RGB values. The color value conversion involves allocating a first number of bits to represent the second RGB value corresponding to the color having the predetermined specific gravity and a second number of bits to represent the RGB values corresponding to remaining ones of the colors. The first and second numbers of bits are different and preferably the first number is greater than the second number. Through this system and method, an M-bit color image may be converted into an N-bit color image with greater color accuracy than other methods which have been proposed.

50 Claims, 3 Drawing Sheets

IMAGE CONVERTING APPARATUS AND METHOD THEREOF

BACKGROUND OF THE INVENTION

1. Field of the Invention

The present invention generally relates to processing images, and more particularly to a system and method for converting a color image of a first bit size into a color image of a second bit size.

2. Background of the Related Art

In the related art, a pallet has been developed to indicate color information for an 8-bit image. Accordingly, when a color value of a pixel of an 8-bit color image is calculated, a red/green/blue (RGB) value can easily be read from the pallet only by using an index value. However, unlike an 8-bit image, no pallet concept has been developed for expressing color information in a 16-bit image. This is because 16-bit images are expressed using 2 bytes and because a pixel itself has color information. Thus, RGB values corresponding to pixels in a 16-bit image have to be obtained through calculation. The method used to calculate RGB values for a 16-bit image can differ depending upon the type of image conversion method.

When a 24-bit image is converted to a 16-bit image supported by a mobile communication terminal, in order to allocate RGB values for each of the pixels of the 24-bit image to the 16-bit image evenly, the color value for each pixel in the 24-bit image is divided by 3, and five bits are then allocated for each of the RGB colors in the 16-bit image and one bit remains unused. More specifically, two 16-bit color display methods have been proposed in the related art which involve converting a 24-bit image into a 16-bit. These methods are the 5:5:5 method and the 5:6:5 method.

FIG. 1 shows how an image converting process is performed using the 5:5:5 method. In converting an 8-bit RGB value into a 16-bit RGB value, 5 bits are allocated to each of the R, G, B colors and the remaining 1 bit is not used. More specifically, 8-bit RGB values in respective shifters 111–113 are stored in a memory 114 as 5-bit values, and the remaining 1 bit (represented as the leading "0" bit) is not used.

In the 5:5:5 method, color values are calculated as follows. When there are RGB colors, RGB values are represented by 5 bits each, which means that a loss of 3 bits occurs for each color in the 24-bit image. This may be described as R16=R/8, G16=G/8 and B/16=B/8. After calculating 16-bit color, the R value stored in shifter 111 is shifted towards the right 3 bit positions and the remaining R bits are output to register 114, which is shifted toward the left to the 10$^{th}$ bit position. The G value stored in register 112 is shifted towards the right 3 bit positions and the remaining G bits are output to register 114, which is shifted toward the left to the 5$^{th}$ bit position. And, the B value stored in register 113 is shifted towards the right 3 bit positions and the remaining B bits are output to register 114. Accordingly, a 16-bit RGB value is obtained in register 114 with a 0 value inserted into the 16$^{th}$ bit position.

FIG. 2 shows how an image converting process is performed using the 5:6:5 method in accordance with the related art. First, 8-bit RGB values are converted into a 16-bit RGB value, by respectively allocating 5 bits to each of the R, G and B values. The remaining 1 bit is unconditionally allocated to the G value at all times. This extra bit allocation is performed because the eyes of a human being classify green color well. Therefore, providing the extra bit to the green color ostensibly helps in this regard.

Unlike the 5:5:5 method, in the 5:6:5 method, the R and B values respectively lose 3 bits but the G value loses 2 bits. The R and B values therefore have a start bit different from each other. More specifically, when there are RGB colors, R and B respectively have 5 bits and G has 6 bits. This may be described as R16=R/8, G16=G/4 and B16=B/8.

After calculating a 16-bit color as a combined 16-bit RGB value for each pixel, the R value in register 211 is shifted towards the right 3 bits and the remaining R bits are output to register 214, which is shifted towards the left to the 11$^{th}$ bit position. The G value in register 212 is shifted towards the right by 2 bits and the remaining G bits are output to register 214, which is shifted towards the left to the 5$^{th}$ bit position. And, the B value in register 213 is shifted towards the right by 3 bits and the remaining B bits are output to register 214. Accordingly, a 16-bit RGB value is obtained in register 214.

In the 5:5:5 method of the related art, by wasting 1 bit, more color information of an actual image is lost. And in the 5:6:5 method, 1 more bit is unconditionally allocated to the G value than to the R and B values, thereby emphasizing the G color more than an actual color. As a result, the image may be converted into an image which is generally similar to a C color. A need therefore exists for a system and method which more accurately and efficiently represents color information in a converted color image, including but not limited to 16-bit color images which have been formed as a result of a conversion process from a 24-bit color image.

SUMMARY OF THE INVENTION

An object of the invention is to solve one or more of the problems of the related art discussed above.

Another object of the present invention is to provide a system and method for more accurately representing color information in a converted color image compared with related art methods.

Another object of the present invention is to achieve the aforementioned object by more efficiently converting M-bit color information into N-bit a color information.

Another object of the present invention is to achieve the aforementioned object when M>N.

Another object of the present invention is to provide an image converting apparatus and a method which minimizes color information loss in the exemplary case of when 24-bit RGB image data is converted into 16-bit image data. The converted 16-bit image data may then be displayed on any suitable device including but not limited to a mobile communication terminal in a manner substantially similar to an actual image. In accordance with one embodiment, this is accomplished by determining which of a plurality of colors in the 24-bit image has a predetermined specific gravity relative to the other colors and then allocating at least one extra bit to represent that color in the conversion process. The predetermined specific gravity is preferably a comparatively greater specific gravity among the RGB colors.

To achieve these and other advantages, the apparatus of the present invention includes in one embodiment an RGB dividing unit for dividing a 24-bit color image into 8-bit RGB values on a per-pixel basis; a comparing unit for judging a color having a comparatively greater specific gravity by calculating a color value of each 8-bit R, G, B; a shift unit for shifting each 8-bit R, G, B in order to allocate more pertinent color bit to the color having the comparatively greater specific gravity; a combining unit for generating a 16-bit image by combining the shifted each R, G, B; and a video memory for storing the generated 16-bit image.

An embodiment of the method of the present invention includes dividing a color image into RGB values, judging a color having a predetermined (e.g., comparatively greater) specific gravity after calculating each of the RGB color values, comparing the color values, allocating at least one extra bit to represent the color having the comparatively greater specific gravity, and combining bit-allocated RGB values to form the converted image.

DETAILED DESCRIPTION OF PREFERRED EMBODIMENTS

Figure 1:
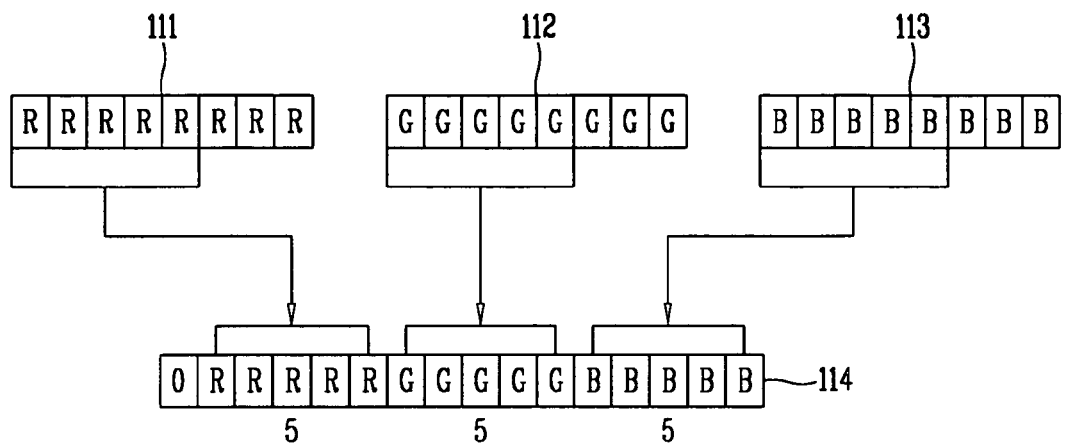
FIG. 1 is a view illustrating a related-art process for performing 5:5:5 color image conversion.
Figure 2:
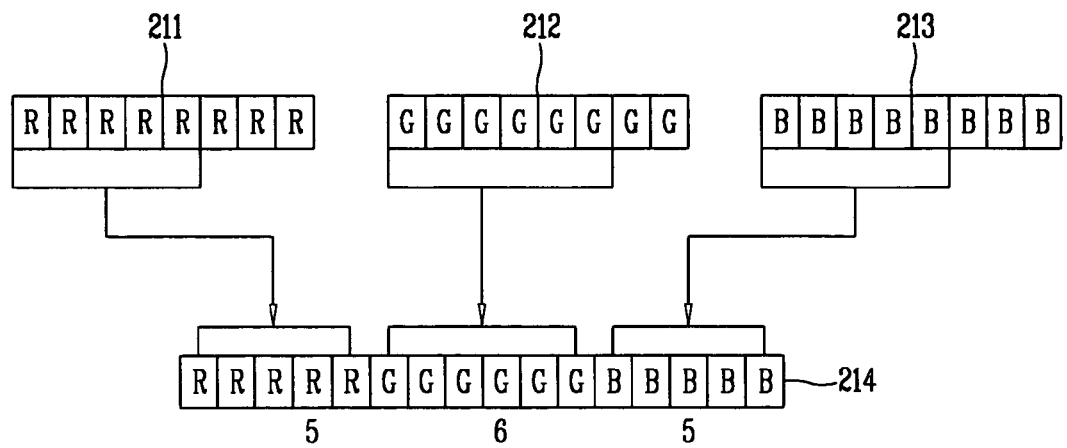
FIG. 2 is a view illustrating a related-art process for performing 5:6:5 color image conversion.
Figure 3:
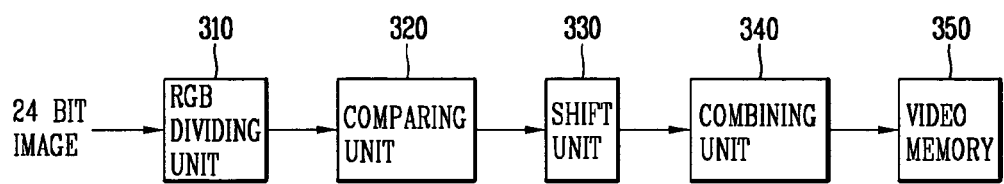
FIG. 3 is a block diagram illustrating an image converting apparatus in accordance with one embodiment of the present invention.

FIG. 3 is a block diagram illustrating an image converting apparatus in accordance with one embodiment of the present invention. The image converting apparatus includes an RGB dividing unit 310 for dividing a 24-bit color image into respective 8-bit RGB color values per pixel, a comparing unit 320 for judging a color having a comparatively greater specific gravity, and a shift unit 330 for shifting each of the 8-bit R, G, B values for each pixel in order to allocate one or more additional color bits to the color having the comparatively greater specific gravity. A combining unit 340 then generates a 16-bit color image by combining the shifted R, G, B values and a video memory 350 stores the generated 16-bit image.

Operation of the image converting apparatus in accordance with the present invention will now be described. First, the RGB dividing unit 310 divides a 24-bit color image received from an external source into respective 8-bit R, G, B color values for each pixel using one of a variety of known techniques.

The comparing unit 320 judges which one of the three colors has a comparatively greater specific gravity than the other colors. This involves calculating a color value for each of the 8-bit R, G, B images generated by the RGB dividing unit 310 and then comparing the color values. For example, a given pixel in the 24-bit image may have a red color value of 127, a green color value of 221, and a blue color value of 64. These values may be measured on a scale similar to a grayscale, where color shades are represented as values ranging from 0 to 255. The color having the greater specific gravity may be selected as the one with the greater color value, which in this case is the green color. Those skilled in the art can appreciate that other known methods of determining the specific gravity of colors in an image may be used in lieu of the exemplary technique just described.

Next, in order to allocate more bits to the color having the comparatively greater specific gravity and to allocate a lesser number of bits to each of the remaining two colors, the shift unit 330 respectively shifts the 8-bit R, G, B values for each pixel. The combining unit 340 then generates a 16-bit image by combining the shifted R, G, B values on a pixel-by-pixel basis. Each pixel in the converted 16-bit image is therefore given a color value wherein 6 bits are allocated to the color having the comparatively greater specific gravity and 5 bits are allocated to each of the remaining two colors.

Next, the generated 16-bit image is stored in the video memory 350 and is transmitted to a display apparatus (not shown). Accordingly, an image similar to an actual image can be displayed.

As described above, after judging the color having the comparatively greater specific gravity, the process for generating a 16-bit image by allocating one bit more to the color having the comparatively greater specific gravity will be described in detail with reference to accompanying FIGS. 4–6. First, a case in which 8-bit R has a comparatively greater specific gravity will be described.

Figure 4:
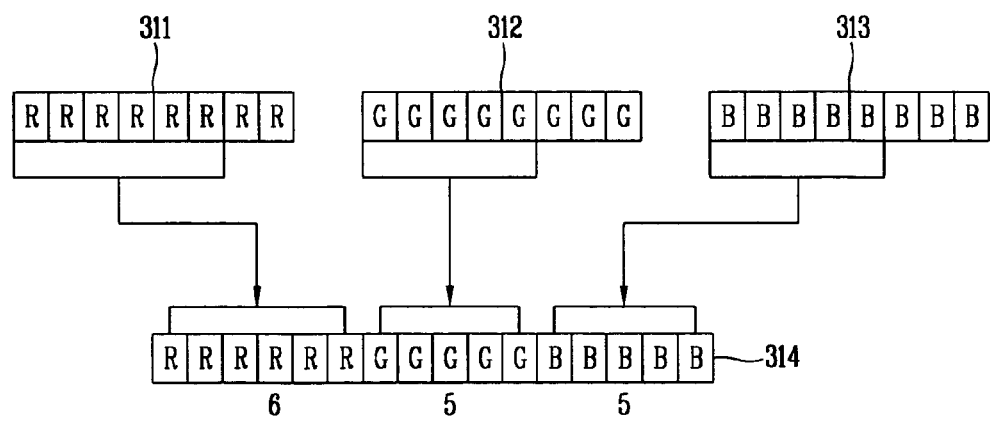
FIGS. 4–6 are exemplary views illustrating image converting processes in accordance with preferred embodiments of the present invention.

FIG. 4 is an exemplary view illustrating an image converting process when R has a comparatively greater specific gravity. When R has a comparatively greater specific gravity, the 8-bit RGB values for each pixel in the 24-bit image is converted into a combined 16-bit RGB value, with the extra 1 bit allocated to the R value. This may be described as R16=R/4, G16=G/8 and B16=B/8.

More specifically, the combined 16-bit color value is formed by shifting R value in register 311 toward the right by 2 bits and then outputting the remaining 6 R bits to register 314. To accomplish this, register 314 is shifted toward the left to the $10^{th}$ bit position. Then, the G value in register 312 is shifted towards the right 3 bits and the remaining 5 G bits are output to register 314. To accomplish this, register 314 is shifted towards the left to the $5^{th}$ bit position. The B value is shifted towards the right 3 bits and the remaining B bits are output to register 314. As a result, the combined 16-bit color value has 6 R bits, 5 G bits, and 5 B bits.

Figure 5:
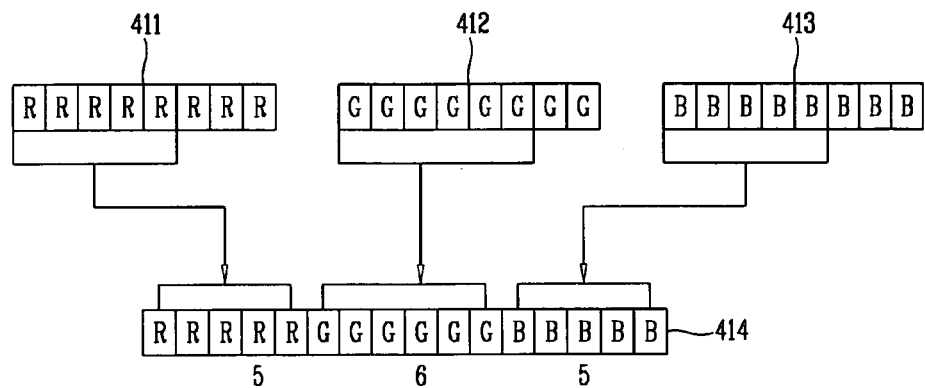

FIG. 5 is an exemplary view illustrating an image converting process when G has a comparatively greater specific gravity. When G has the comparatively greater specific gravity, the 8-bit RGB values for each pixel in the 24-bit image are converted into a combined 16-bit RGB, with the extra 1 bit allocated to the G value. This may be described as R16=R/8, G16=G/4 and B16=B/8.

In the conversion process, a combined 16-bit color value for each pixel is formed by shifting the R value in register 411 towards the right 3 bits and then outputting the remaining 5 R bits to register 414. To accomplish this, register 414 is shifted towards the left to the $11^{th}$ bit position. The G value in register 412 is shifted toward the right 2 bits and the remaining 6 G bits are output to register 414. To accomplish this, register 414 is shifted toward the left to the $5^{th}$ bit position. The B is shifted towards the right 3 bits and the remaining 5 B bits are output to register 414.

Figure 6:
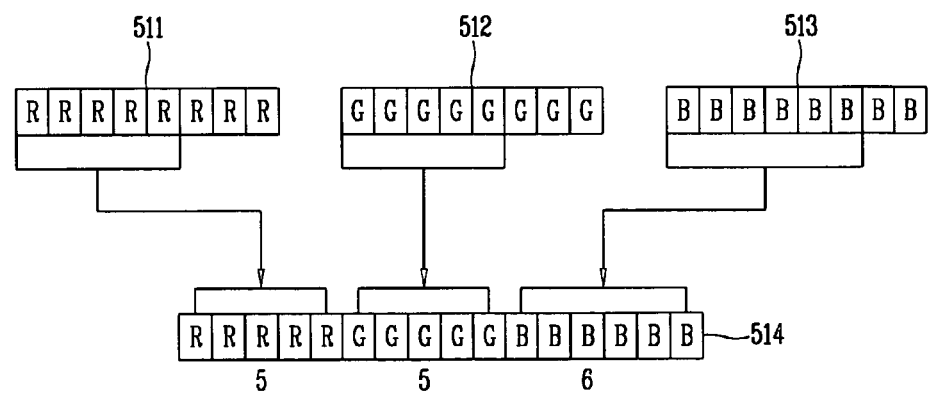

FIG. 6 is an exemplary view illustrating an image converting process when B has a comparatively greater specific gravity. When the B has the comparatively greater specific gravity, the 8-bit RGB values for each pixel in the 24-bit image are converted into a combined 16-bit RGB value, with the extra 1 bit allocated to B. This may be described as R16=R/8, G16=G/8 and B16=B/4.

In the conversion process, a combined 16-bit color value for each pixel is formed by shifting the R value in register 511 toward the right 3 bits and then outputting the remaining 5 R bits to register 514. To accomplish this, register 514 is shifted towards the left to the $11^{th}$ bit position. The G value is shifted towards the right 3 bits and the remaining 5 G bits in register 512 are output to register 514. To accomplish this, register 514 is shifted towards the left to the $6^{th}$ bit position. The B value in register 513 is shifted toward the right 2 bits and the remaining 6 bits are output to register 514.

The above-mentioned processes for forming 16-bit RGB values for a 24-bit color image on a pixel-by-pixel basis are performed by the shift unit 330. Accordingly, the finally generated image containing the converted 16-bit RGB values is stored in the video memory 350. Afterward, the 16-bit RGB image may be transmitted to a display apparatus such as a LCD, etc. and is displayed as an image similar to an actual image.

In the foregoing exemplary embodiments, the present invention has been described as determining color for a 16-bit image that has been converted from a 24-bit image. While this is an especially advantageous application of the present invention, those skilled in the art can appreciate that the invention may be used to express color for other-size image conversions, e.g., in an N-bit size color image converted from an M-bit size image, when M>N.

The present invention thus improves the conventional 5:6:5 method in terms of color accuracy and process efficiency by allocating more (e.g., 6) bits to a color having a comparatively greater specific gravity than the bits allocated to represent the other colors. As a result, through the present invention a 16-bit image more similar to an actual image can be displayed on a mobile communication terminal. Accordingly, by applying the present invention to, for example, a mobile communication terminal to display 16-bit color, a more distinctive image can be provided to a user.

In addition, it is possible to use both a method for varying conversion according to the greatest value by comparing a RGB value of each color value and a method for converting all color data according to the greatest value by calculating all RGB values of a whole image simultaneously.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An image converting apparatus, comprising:
   a divider which divides a 24-bit color image into respective 8-bit RGB values per pixel;
   a comparator which judges which one of the colors corresponding to the RGB values has a comparatively greater specific gravity;
   a shifter which shifts each of the 8-bit RGB values in order to allocate at least one extra bit to the color having the comparatively greater specific gravity; and
   a combiner which generates a 16-bit image by combining the shifted RGB values, wherein the shifter shifts the RGB values to allocate a same number of extra bits irrespective of which one of the colors is judged to have the greater specific gravity.

2. The apparatus of claim 1, wherein the shifter shifts the 8-bit RGB values so that 6 bits are output to the combiner for the color having the comparatively greater specific gravity.

3. The apparatus of claim 1, wherein the shifter allocates 5 bits to the colors having a comparatively less specific gravity respectively.

4. The apparatus of claim 1, wherein the shifter shifts the RGB values so that the at least one extra bit is allocated to the R value when R has a comparatively greater specific value.

5. The apparatus of claim 1, wherein the shifter shifts the 8-bit R value by 2 bits and outputs the remaining 6 R bits to the combiner, shifts the 8-bit G value by 3 bits and outputs the remaining 5 G bits to the combiner, and shifts the 8-bit B value by 3 bits and outputs the remaining 5 B bits to the combiner.

6. The apparatus of claim 1, wherein the shifter generates the RGB values to produce a bit ratio of 6:5:5 for each pixel in the 16-bit image.

7. The apparatus of claim 1, wherein the shifter allocates the at least one extra bit to the G value when G has the comparatively greater specific gravity.

8. The apparatus of claim 1, wherein the shifter shifts the 8-bit R value by 3 bits and outputs the remaining 5 R bits to the combiner, shifts the 8-bit G value by 2 bits and outputs the remaining 6 G bits to the combiner, and shifts the 8-bit B value by 3 bits and outputs the remaining 5 B bits to the combiner.

9. The apparatus of claim 1, wherein the shifter generates the RGB values to produce a bit ratio of 5:6:5 for each pixel in the 16-bit image.

10. The apparatus of claim 1, wherein the shifter allocates the at least one extra bit to the B value when B has the comparatively greater specific gravity.

11. The apparatus of claim 1, wherein the shifter shifts the 8-bit R value by 3 bits and outputs the remaining 5 R bits to the combiner, shifts the G value by 3 bits and outputs the remaining 5 G bits to the combiner, and shifts the B value by 2 bits and outputs the remaining 6 B bits to the combiner.

12. The apparatus of claim 1, wherein the shifter generates the RGB values to produce a bit ratio of 5:5:6 for each pixel in the 16-bit image.

13. The apparatus of claim 1, wherein the comparator:
   determines a scale position for each of the RGB values;
   compares the scale positions of the RGB values; and
   judges which one of the RGB values has the greater specific gravity based on a result of the comparison of scale positions.

14. The apparatus of claim 13, wherein the comparator selects an RGB value having the largest scale position as the one having the greater specific gravity.

15. The apparatus of claim 13, wherein the scale positions are equivalent grayscale positions for a respective one of the RGB colors.

16. The apparatus of claim 1, wherein the comparator:
   determines a scale position for each of the RGB values;
   compares the scale positions of the RGB values to one another; and
   judges which one of the RGB values has the greater specific gravity based on a result of the comparison of scale positions.

17. The apparatus of claim 16, wherein the comparator selects a first RGB value having the largest scale position as the one having the greater specific gravity.

18. The apparatus of claim 16, wherein the scale positions are equivalent grayscale positions for a respective one of the RGB colors.

19. An image converting method, comprising:
   dividing a color image into first RGB color values;
   judging which color in the color image has a comparatively greater specific gravity;
   generating second RGB color values from the first RGB color values, said generating step including allocating at least one extra bit to the color having the comparatively greater specific gravity; and
   combining the second RGB color values for each pixel to form a converted color image, wherein generating the second RGB color values includes allocating a same number of extra bits irrespective of which color in the color image is judged to have the greater specific gravity.

20. The method of claim 19, wherein the judging step includes:
calculating the first RGB color values by pixels or calculating the first RGB color values of the whole color image.

21. The method of claim 19, wherein the allocating step includes:
allocating 6 bits including the extra bit to represent the color having the comparatively greater specific gravity; and
allocating 5 bits to represent each of the other colors.

22. The method of claim 19, wherein the allocating step further includes: allocating the at least one extra bit to the second R value when R has the comparatively greater specific gravity.

23. The method of claim 19, wherein the allocating step further includes: allocating the at least one extra bit to the second G value when G has the comparatively greater specific gravity.

24. The method of claim 19, wherein the allocating step further includes: allocating the at least one extra bit to the second B value when B has the comparatively greater specific gravity.

25. The method of claim 19, wherein the first RGB color values are of M-bit size and the second RGB color values have a bit size smaller than M.

26. The method of claim 19, wherein judging includes:
determining a scale position for each of the first RGB color values;
comparing the scale positions of the first RGB color values to one another; and
determining which one of the first RGB color values has the greater specific gravity based on a result of the comparison of scale positions.

27. The method of claim 26, wherein the comparator selects one of the first RGB color value having the largest scale position as the one having the greater specific gravity.

28. The method of claim 26, wherein the scale positions are equivalent grayscale positions for a respective one of the RGB colors.

29. An image conversion method, comprising:
converting an M bit-size image into an N bit-size image wherein M>N, said converting including for each pixel in the M bit-size image (a) generating first RGB values, (b) determining which color in the image has a greater specific gravity, (c) converting the first RGB values into second RGB values each with lesser bit size, the color with the greater specific gravity allocated with at least one extra bit than the remaining colors in the second RGB values, and (d) combining the second RGB values to form the N bit-size image, wherein said converting includes generating the second RGB values for each pixel so as to allocate a same number of extra bits irrespective of which color in the image has the greater specific gravity.

30. The method of claim 29, wherein generating the first RGB values includes:
allocating a first number of bits to represent the second RGB value corresponding to the color having the greater specific gravity; and
allocating a second number of bits to represent the RGB values corresponding to remaining ones of the colors, where the first number of bits and the second number of bits are different.

31. The method of claim 30, wherein the first number of bits is greater than the second number of bits.

32. The method of claim 30, wherein M=24, N=16, the first number of bits is 6 and the second number of bits is 5.

33. The method of claim 29, wherein M=24 and N=16.

34. An image conversion method, comprising:
dividing a first image into first RGB values per pixel;
determining, for each pixel, which color in the first image has a greater specific gravity;
converting the first RGB values into second RGB color values based on the color with the greater specific gravity, the second RGB values having different numbers of bits than the first RGB values respectively; and
forming a second image based on the second RGB values, wherein converting includes allocating a same number of extra bits to the color having the greater specific gravity irrespective of which color has the greater specific gravity.

35. The method of claim 34, wherein the converting step includes:
allocating a first number of bits to represent the second RGB value corresponding to the color having the greater specific gravity; and
allocating a second number of bits to represent the RGB values corresponding to remaining ones of the colors, where the first number of bits and the second number of bits are different.

36. The method of claim 35, wherein the first number of bits is greater than the second number of bits.

37. The method of claim 36, wherein the first image is an M-bit image and the second image is an N-bit image, where M>N.

38. The method of 37, wherein the first number is 6 and the second number is 5.

39. The method of claim 34, wherein the first image is an M-bit image and the second image is an N-bit image, where M>N.

40. The method of claim 39, wherein M=24 and N=16.

41. The method of claim 34, wherein determining includes:
determining a scale position for each of the first RGB color values;
comparing the scale positions of the first RGB color values; and
judging which one of the first RGB values has the greater specific gravity based on a result of the comparison of scale positions.

42. The method of claim 41, further comprising:
selecting the first RGB color value having the largest scale position as the one having the greater specific gravity.

43. The method of claim 41, wherein the scale positions are equivalent grayscale positions for a respective one of the RGB colors.

44. An image conversion apparatus, comprising:
a divider which divides a first image into first RGB values per pixel;
a comparator that determines, for each pixel, which color in the first image has a greater specific gravity;
a converter which converts the first RGB values into second RGB color values based on the color with the greater specific gravity; and
a combiner which forms a second image based on the second RGB values, wherein the converter shifts the first RGB values to allocate a same number of extra bits to the color having the greater specific gravity, irrespective of which one of the colors is judged to have the greater specific gravity.

45. The apparatus of claim 44, wherein the converter allocates a first number of bits to represent the second RGB value corresponding to the color having the greater specific gravity and allocates a second number of bits to represent the RGB values corresponding to remaining ones of the colors, where the first number of bits and the second number of bits are different.

46. The apparatus of claim 45, wherein the first number of bits is greater than the second number of bits.

47. The apparatus of claim 46, wherein the first image is an M-bit image and the second image is an N-bit image, where M>N.

48. The apparatus of claim 47, wherein the first number is 6 and the second number is 5.

49. The apparatus of claim 44, wherein the first image is an M-bit image and the second image is an N-bit image, where M>N.

50. The apparatus of claim 49, wherein M=24 and N=16.

* * * * *